United States Patent [19]

Brenner et al.

[11] Patent Number: 4,644,100
[45] Date of Patent: Feb. 17, 1987

[54] SURFACE ACOUSTIC WAVE TOUCH PANEL SYSTEM

[75] Inventors: Michael C. Brenner, Oak Park; James J. Fitzgibbon, Streamwood, both of Ill.

[73] Assignee: Zenith Electronics Corporation, Glenview, Ill.

[21] Appl. No.: 715,134

[22] Filed: Mar. 22, 1985

[51] Int. Cl.[4] .................. G08C 21/00; G06K 11/06
[52] U.S. Cl. .................................................. 178/18
[58] Field of Search ........................ 178/18, 19, 20; 340/365; 367/117, 127, 907

[56] References Cited
U.S. PATENT DOCUMENTS
4,488,000 12/1984 Glenn .................................. 178/18

Primary Examiner—Stafford D. Schreyer
Attorney, Agent, or Firm—Cornelius J. O'Connor

[57] ABSTRACT

A system for recognizing and locating a touch induced perturbation of a surface acoustic wave propagating along one of a multiplicity of paths disposed transverse to a predetermined coordinate axis on a surface of a touch panel and for utilizing the magnitude of the perturbation to produce a control effect. The system comprises a substrate having a surface capable of propagating surface acoustic waves and is so characterized that a touch on that surface causes amplitude damping of a surface wave passing through the region of touch which damping is related to touch pressure. A transducer, responsive to touch-perturbated surface waves develops an output signal having a first characteristic indicative of the position of the touch on the substrate surface and having a second characteristic indicative of touch pressure.

A control system, which includes a memory and a computer, upon receipt of the output signal, responds to the first characteristic to develop a first control signal reflecting the location of the touch and responds to the second characteristic to develop a second control signal reflecting touch pressure.

10 Claims, 7 Drawing Figures

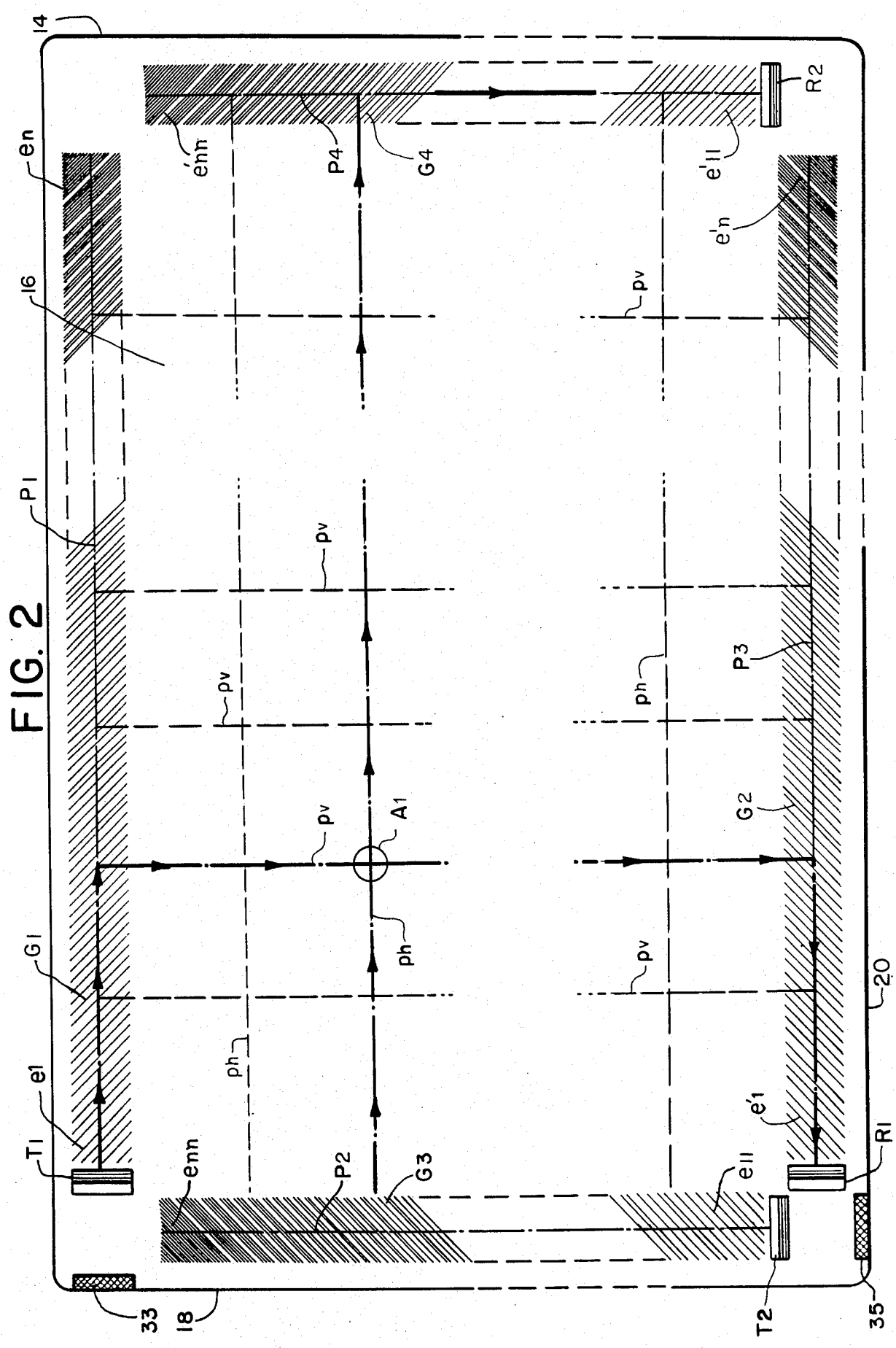

SURFACE ACOUSTIC WAVE TOUCH PANEL SYSTEM

CROSS-REFERENCE TO RELATED APPLICATION

This application is related to, but in no way dependent upon copending application Ser. No. 698,306, filed Feb. 5, 1985 in the name of Robert Adler.

BACKGROUND OF THE INVENTION

This invention relates, in general, to a touch responsive control arrangement for use with controllable apparatus and, in particular, to a novel arrangement and system for producing a control effect related to the pressure of an applied touch.

Controllable apparatus, of the type herein considered, generally contemplates a graphics display device such as a cathode ray tube (CRT), however, other types of apparatus, not necessarily employing a display device, may advantageously be controlled by the invention.

By way of background, in a typical prior art graphics display apparatus, each of two adjacent edges of a device's display surface (faceplate) is provided with a bank of light sources arranged to develop a cluster of parallel light paths which extend across the faceplate, the clusters intersecting, preferably at right angles, to form a grid-type pattern of light paths overlying the display surface. Like banks of light detectors flank those sides of the faceplate opposite the banks of light sources.

In practice, a particular graphic is delivered for display by a controller in response to an operator's command, which command can take the form of a pointing to one area of the faceplate. This pointing serves to interrupt one or more of the light beams, which interruption causes the beam's assigned light detector to develop a signal which is applied to the controller to select a particular graphic. U.S. Pat. No. 3,775,560, for example, exemplifies this type of control for a graphics display apparatus. A touch control arrangement of the type adverted to above tends to be rather costly since a separate light sensor is employed for each light source.

It is known to use surface acoustic wave (SAW) energy for touch control. Prior art U.S. Pat. No. 3,134,099-Woo teaches an arrangement in which a plurality of piezoelectric transducers, electrically connected in parallel, is disposed along each of two adjacent edges of a sheet of glass. The transducers are coupled to the sheet and, in response to a control signal, create surface waves which propagate across the surface of the glass sheet. A writing pen, embodying a piezoelectric component, is placed in contact with the glass sheet to sense a propagating disturbance and then issue an appropriate signal to a control unit which measures the elapsed time interval between the time the control signal was applied to the transducer that initiated the disturbance and the time the signal was received by the pen. It is of significance that, in the Woo arrangement, a plurality of piezoelectric transducers is required for each of two adjacent sides of the glass panel. Further, the Woo system requires the use of a special touch stylus capable of sensing surface acoustic waves traveling across the panel.

U.S. Pat. No. 3,653,031-Hlady, et al is addressed to a touch sensitive position encoder also employing elastic surface wave generating transducers positioned along the edges of a sheet of transparent glass. The transducers function as radiators, as well as sensors, and thus serve to launch surface waves across the glass sheet, as well as to receive such waves. In operation, a finger or stylus placed at a particular position on the glass sheet serves to reflect the surface waves encountered. A reflected wave that is detected is applied to timing circuitry associated with the sensors, which circuitry determines the geometric coordinates of the position of the finger or stylus. Again, as in Woo, two arrays, or banks, of transducers are required to create the surface waves that propagate across the glass sheet.

U.S. Pat. No. 3,673,327-Johnson, et al describes still another SAW-type touch responsive panel assembly comprising a panel positioned over the faceplate of a CRT and having a first plurality of transmitters positioned along a first edge of the panel for generating a like plurality of Rayleigh (surface) beams that propagate across the surface of the panel in an X direction and a like plurality of detectors positioned along the edge of the panel opposite said first edge for individually receiving an assigned one of said pluralilty of beams. In like fashion, a second plurality of transmitters is positioned along a second edge of the panel, adjacent the first edge, for simultaneously generating a second plurality of Rayleigh wave beams that propagate across the panel in a Y direction, perpendicular to the X direction. A like second plurality of detectors is positioned along the edge of the panel opposite said second edge for receiving an assigned one of said second plurality of beams. Accordingly, to establish this X-Y grid of wave beams, a transmitter is required for each wave beam and a separate detector is required for each such transmitter.

Each transmitter, upon actuation, launches a beam of Rayleigh surface waves along the surface of the panel. Thereafter, when a finger or other object is pressed against the panel, acoustical wave energy is absorbed, thereby interrupting its transmission to its assigned detector. The absence or reduction of the normal signal at a specific detector constitutes a touch indication which is applied to a computer.

However, a principal drawback of the Johnson et al touch control system, like that of its optical counterpart, resides in the requirement of a multiplicity of transmitters and detectors to establish the intersecting wave energy paths that form the grid overlying the panel. The mechanical considerations, and eost, involved in the practice of utilizing dual pluralities of transmitters and detectors, all of which must be separately wired, are obvious shortcomings.

Other patents in the touch control art are set forth below:

U.S. Pat. No. 3,775,560
U.S. Pat. No. 3,808,364
U.S. Pat. No. 3,916,099
U.S. Pat. No. 3,956,745
U.S. Pat. No. 4,198,623
U.S. Pat. No. 4,254,333
U.S. Pat. No. 4,286,289
U.S. Pat. No. 4,346,376.

Additionally, art in the field of surface acoustic waves which was considered included:

U.S. Pat. No. 3,883,831
U.S. Pat. No. 4,403,165.

"Use of Apodized Metal Gratings in Fabricating Low Cost Quartz RAC Filters" by G. W. Judd and J. L. Thoss. Proceedings of the IEEE 1980 Ultrasonics Symposium, p. 343.

OBJECTS OF THE INVENTION

It is therefore a general object of the invention to provide an improved touch responsive control arrangement for use with controllable apparatus.

It is another object of the invention to provide an improved touch responsive control arrangement for, or for use with, a graphics display device.

It is a specific object of the invention to provide a touch responsive control arrangement for use with controllable apparatus in which a control effect is governed by touch pressure.

BRIEF DESCRIPTION OF THE DRAWINGS

The features of the present invention believed to be novel are set forth with particularity in the appended claims. The invention together with further objects and advantages thereof, may best be understood by reference to the following description taken in conjunction with the accompanying drawnigs, in the several figures of which like reference numerals identify like elements, and in which:

FIG. 2 is a plan view of the FIG. 1 touch responsive display panel depicting, in some detail, reflective grating construction and placement;

The present invention pertains to an improved touch panel control system 10, FIG. 1A, which finds particular application for use with a touch panel apparatus 12 of the type described and claimed in the application Ser. No. 698,306, filed Feb. 5, 1985 in the name of Robert Adler. Accordingly, as much of the Adler disclosure that establishes background for the present invention will be presented herein. To that end FIG. 1 shows a controllable display device 14 having a display surface 16. A CRT may be employed to display called-for graphics and, initially, the touch panel control system will be described in that environment. However, it is to be appreciated that the invention is readily applicable to other display devices, e.g., electroluminescent or liquid crystal devices, or even displays as simple as an elevator number display, any of which can be employed in lieu of a CRT. In some applications, a separate touch panel is disposed over the faceplate of the display device or, it may be tablet positioned at a location remote from the display device.

Moreover, controllable apparatus not necessarily employing a display device may advantageously employ the subject touch-responsive control system for performing functions that do not necessarily require the display of graphics or other information, e.g., to issue an audible or visible instruction, command, etc.

The faceplate, or panel, is commonly designated a "touch control panel" since graphics, or other information may be ordered up for display from a controller in response to an operator's command which can take the form of a touching of a particular area of a menu, or directory, associated with the touch control panel. Surface 16, whether it be the CRT faceplate or a separate panel, constitutes a substrate the surface of which is capable of propagating surface acoustic waves. As will be shown, the act of touching causes a perturbation of the surface wave propagating through the region of the touch. In practice, in an X-Y execution of the system, the perturbation is manifested as an interruption or reduction of the wave energy directed along one or more paths that form a grid overlying the substrate surface. Moreover, in a manner to be fully developed below, in accordance with the invention the pressure applied to the panel during the act of touching is utilized to produce a control effect. Detection and analysis of such perturbation serves to identify the X, Y, or other coordinates of the touched area, which information, in turn, is determinative of an output from a controller, which can be graphics delivered up for display or some other response. Additionally, the touch pressure employed to induce the perturbation is subjected to an analysis that can produce an additional control effect.

To this end, the touch panel control system 10, which is detailed in FIG. 1A and fully described below, includes a computer 22 for rendering associated circuitry operative in a predetermined sequence so that when a touch-induced perturbation of acoustic wave energy is detected, converted to an electrical signal and fed back to the computer, the location of the touch, as well as the touch pressure employed to induce the perturbation, are identifiable by the computer and converted to control signals containing information indicative of touch location and touch pressure. As will be shown, these signals are applied to a controlled device 23, which can be the display device 14 adverted to above.

Figure 1:
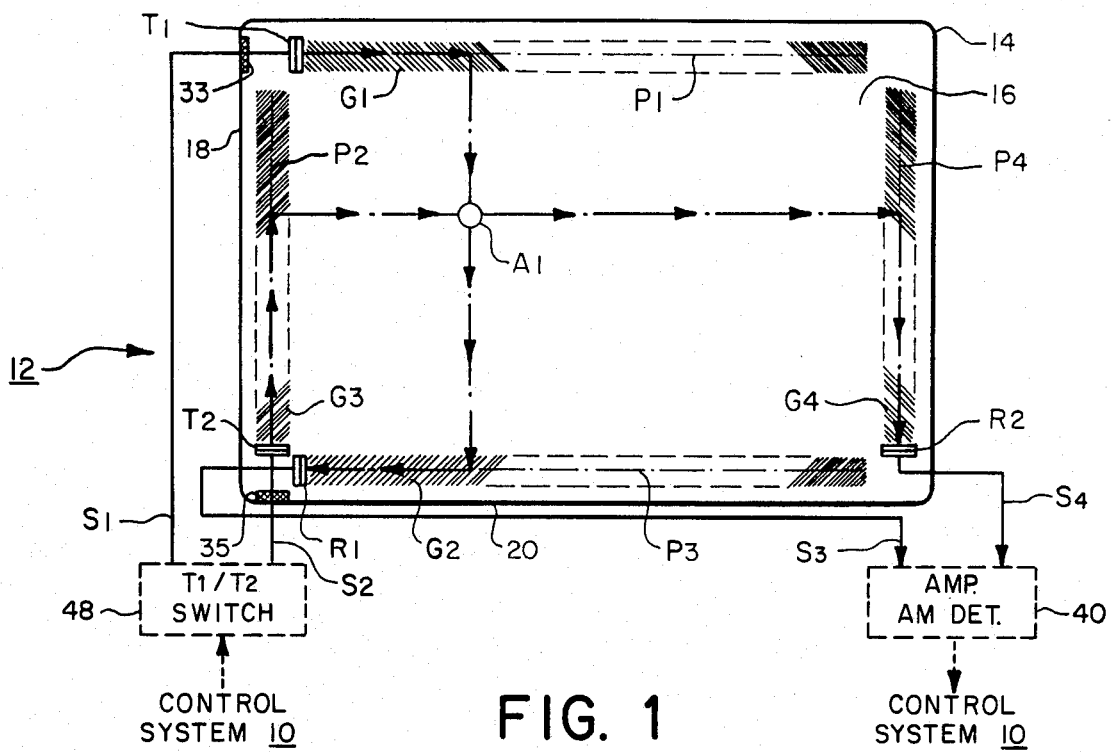
FIG. 1 illustrates, partially in schematic form, a graphics display apparatus for utilizing the invention.

As shown in FIG. 1, substrate surface 16 supports a pair of input, or transmitter transducers T1, T2 and a pair of output, or receiver, transducers R1, R2. In a manner to be described below, in connection with the explanation of system 10, transducers T1, T2 are stimulated by firing signals in a timed sequence so that the location of a subsequent perturbation of a surface wave is identifiable. Input transducers T1, T2, which are more particularly described below, are mounted upon substrate surface 16 adjacent to edges 18 and 20, respectively, see FIG. 2. A source T1/T2 switch associated with the computer 22, shown in FIG. 1A, serves to apply input firing signals S1, S2 to respective transducers T1, T2, which transducers, in response thereto, individually launch a burst of acoustic surface waves along first and second paths P1, P2, respectively on substrate surface 16.

Also as shown in FIG. 2, first and second output transducers R1, R2, are mounted upon substrate surface 16 adjacent to respective edges 18, 20 that is, the edges close to their associated input transducer T1, T2. In a manner to be detailed below, transducers R1, R2, upon receipt of the surface waves launched by their associated input transducers that experience as touch-induced perturbation will develop respective output signals S3, S4 which, upon analysis, will exhibit a first characteristic indicative of the position, or location of the touch on the substrate surface and a second characteristic indicative of the touch pressure.

A first reflective grating G1 comprising an array of reflective elements e1–en is disposed along path P1 with each of the aforesaid elements effectively arranged, preferably at like angles of incidence to the longitudinal axis of path P1. Desirably, the angles of incidence of the reflective elements, relative to the axis of path P1, are approximately 45 degrees. Additionally, the longitudinal axis of path P1 is preferably disposed parallel to the upper edge of substrate surface 16, as viewed in FIGS. 1 and 2.

Reflective elements e1–en serve to extract from the initially launched surface wave burst a multiplicity of wave components and to direct such wave burst components across substrate surface 16 along a like multiplicity of paths pv each disposed at an angle to the axis of path P1. As best depicted in FIG. 2, these multiplicities of paths are each disposed at 90 degrees to the axis of path P1.

A second reflective grating G2 likewise comprises an array of reflective elements e1–en which are disposed along path P3 and are effectively arranged at like angles of incidence to the longitudinal axis of path P3 for intercepting the wave components extracted from the wave traversing path P1 and directed across substrate surface 16 along the paths pv. Grating G2 intercepts the wave burst components arriving along paths pv and redirects them along path P3 toward receiving transducer R1 which converts the wave energy in a received burst to an electrical output signal S3. In a fashion complementary to that of the first reflective grating G1, the elements of grating G2 are disposed at 45 degrees to the longitudinal axis of path P3 to facilitate interception and redirecting of wave components arriving from grating G1.

The above-described transducer pair T1, R1 and gratings G1, G2 serve to establish one portion of a grid of surface wave burst paths pv which are disposed across substrate surface 16. A second portion of that grid is established by a second pair of transducers T2, R2 and associated gratings G3, G4. In a manner similar to that described above, transducer T2, in response to a firing signal S2 launches a burst of acoustic surface waves along the path P2, which path is disposed perpendicular to the previously described paths P1, P3. The third reflective grating G3 comprises an array of reflective elements e11–enn which are disposed along path P2 with the elements effectively arranged at like angles of incidence to the axis of path P2. Grating G3 serves to extract from the surface wave launched by transducer T2 a multiplicity of wave burst components and to direct such wave burst components across substrate surface 16 along a multiplicity of paths ph each disposed at a 90 degree angle to the axis of path P2.

A fourth reflective grating G4, comprising an array of reflective elements e'11–e'nn is disposed along path P4, each element being arranged at a 45 degree angle to the longitudinal axis of path P4. The reflective elements of grating G4 intercept the wave components directed thereto by the elements of grating G3 along paths ph and redirect these intercepted wave burst components along path P4 to receiving transducer R2.

Since transducers T1, T2 additionally launch surface acoustic waves along paths P1, P2 in directions opposite from their respective adjoining gratings G1, G3, it is desirable to provide means for arresting such wave energy. Accordingly, a pair of absorbers 33, 35, which can be formed of a soft epoxy, are mounted upon the display surface immediately behind respective transducers T1 and T2.

In the manner just described, and as depicted in FIG. 2, display surface 16 is now provided with an overlying grid comprising a multiplicity of intersecting paths of acoustic surface wave bursts which surface waves are confined to predetermined paths, one series ph being disposed parallel to what may be termed the horizontal or major axis of display surface 16 while a second, intersecting series of paths pv are disposed parallel to the vertical or minor axis of the display surface. In this fashion intersecting wave energy paths traverse the surface of the display device, forming an invisible grid that overlies display surface 16.

As will now be described, means are coupled to the input transducers T1, T2 for initiating the launching of bursts of surface waves along paths P1, P2. The application of signals S1, S2 to transducers T1, T2 serve to generate and launch across substrate surface 16 elastic (ultrasonic) surface waves having a substantially planar wavefront with uniform amplitude and phase along lines parallel to the initiating transducer. Transducers T1, T2, (as well as R1 and R2) typically, are piezoelectric transducers comprised of a lead zirconate-titanate ceramic mounted upon a prism of lower velocity material, e.g., Lucite, which effects an efficient electromechanical coupling to substrate surface 16.

Figure 3:
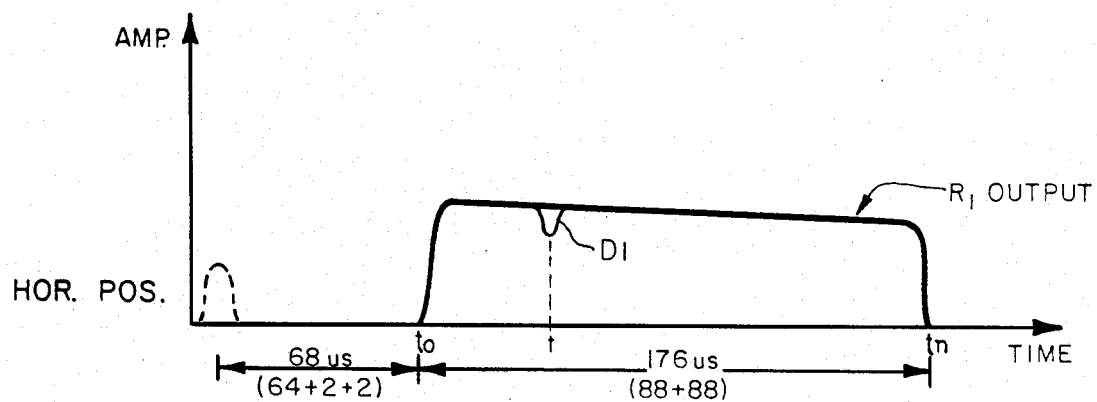
FIG. 3 is a graphical plot representative of received surface acoustic wave energy traversing one coordinate of the touch panel of FIG. 1.

The generated surface waves launched along paths P1, P2 are eventually received by transducers R1, R2, respectively, and converted to electrical signals S3, S4. Means including an amplifier and AM detector 40, see FIG. 1A, is coupled to the outputs of receiving transducers R1, R2 for determining, by an analysis based on the transit time of the perturbed surface wave burst, which of paths ph, pv the touch-perturbed wave traversed and thereby establish the location of the touch along two coordinates of substrate 16. In a one coordinate system, for example, in order to identify the X coordinate for the location of the path of a perturbed wave burst along the horizontal axis, as viewed in FIG. 2, the determining means is arranged to make a time analysis of the surface wave burst received by transducer R1. To this end, the determining means analysis commences at the instant input signal S1 is applied to transducer T1 to launch a surface wave. On the time scale of FIG. 3 there is plotted the earliest time an acoustic wave burst from transmitter T1 could arrive at receiver R1.

Assuming that the dimensions of the grid formed by gratings G1, G2 overlying substrate surface 16 are approximately 8"×11", and assuming further that the transit time required for a surface wave burst to reach the first reflective element e1 on path P1 is approximately 2 microseconds, as is the transit time required for the surface wave burst to travel to receiver R1 from element e'1, to this is added the transit time of the surface wave from reflective element e1 across the display surface 16 to element en, which is approximately 64 microseconds. Accordingly, the control system 10 will ignore any disturbance arriving within the first 68 microseconds immediately following the triggering of transmitter T1. Assuming for the moment, that no disturbance or perturbation of the initial surface wave launched by T1 is experienced, the output of transducer R2 might exhibit the solid line response shown in FIG. 3. Depicted therein is a waveform having a relatively constant amplitude extending for approximately 176 microseconds. This response is established by virtue of the fact that, for a period commencing at t0, surface wave energy is continually received by the detector R1 for 176 microseconds that is until time tn. The 176 microsecond interval is the approximate time required for a surface wave to traverse the entire length of reflective grating G1 and return along the length of reflective grating G2. In the absence of a perturbation, the output of receiver transducer R2, when analyzed by control system 10, will supply a signal to computer 22 which is indicative of the fact that an uninterrupted burst of surface waves traversed substrate surface 16 without interference. The computer relays this information to controlled device 23 which, in turn, maintains the pre-existing condition of the display device 14 undisturbed.

Assuming now that an operator wished to select a graphic other than that being displayed. A menu, such as a chart or other type of directory, would indicate which particular area of substrate surface 16, should be touched to call up the desired graphic. Accordingly, assuming that the particular area is that designated A1 in FIG. 2, the operator then inserts his finger into the grid of intersecting surface waves by touching the display surface at A1, which action causes a portion of the acoustic surface wave energy traversing the touched area to be absorbed. This act of touching is best explained, and manifested, by reference again to FIG. 3 which depicts the effect upon the output waveform of R1 attributable to a perturbation of the surface wave traversing the display surface in the vicinity of area A1. This effect is manifested in the waveform as a dip D1 along the time axis which corresponds to the point where the operator touched the panel. The depth of the dip is indicative of the pressure that the operator applied during his touch. Let us assume that the point of touch occurred approximately one-fourth of the distance along the major axis of the display surface commencing from the left side, as viewed in FIG. 2. As previously noted, it was assumed that the time entailed for a surface wave to travel the length of grating G1 was 88 microseconds. One-fourth of that time would be 22 microseconds. Adding to that number the 64 microseconds required for the wave to traverse the paths parallel to the minor axis of the surface, the 22 microseconds entailed in traversing a corresponding portion of array G2, and finally adding the 4 microseconds (2+2) initial and terminal transit times, the detector output waveform would indicate that a perturbation of the wave burst transmitted by T1 and subsequently received by R1, occurred approximately 112 microseconds (2+2+64+22+22) after the transmitter T1 launched the surface wave under consideration. This 112 microsecond interval is analyzed by computer 22 which informs the controller 12 that a perturbation was detected by receiver R1 at a particular instant in the time domain.

Figure 4:
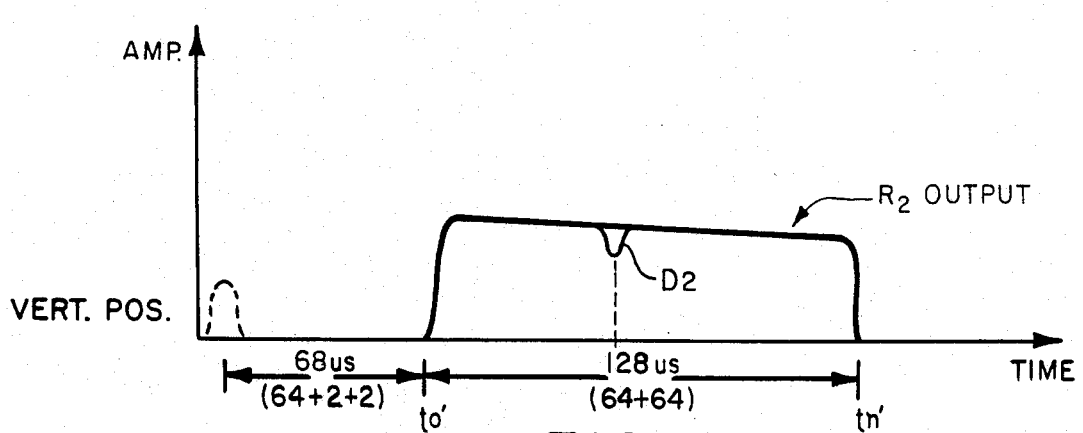
FIG. 4 is a graphical plot representative of received surface acoustic wave energy traversing a second, orthogonal, coordinate of the touch panel of FIG. 1.

Preferably, a short time after T1 launched a surface wave a burst is launched by transmitter T2 and reflected by gratings G3 and G4 to return the components of that wave to receiver R2. In the manner described above with reference to a perturbation detected by R1, the surface wave components now traversing a path ph parallel to the major axis of the display surface are detected by R2 which establishes, in like fashion, the occurrence and time when the aforementioned perturbation of the wave, manifested in FIG. 4 as dip D2, was experienced along the Y-axis. Again, the depth of D2 is indicative of touch pressure. Applying this time-related information to that developed relative to the other axis, the computer informs the controlled device of the coordinates of the perturbation (touching A1) so that that device may deliver for display upon the CRT screen the particular graphics associated or assigned to the location at which the touching occurred.

It is recognized that simultaneous operations to identify both coordinates are possible, but the preferred mode of operation is to alternate between the two. The latter practice eliminates crosstalk problems and makes it possible to economize by switching certain circuit elements (e.g. a tuned amplifier) between coordinate identifying channels, instead of duplicating such elements.

Figure 1A:
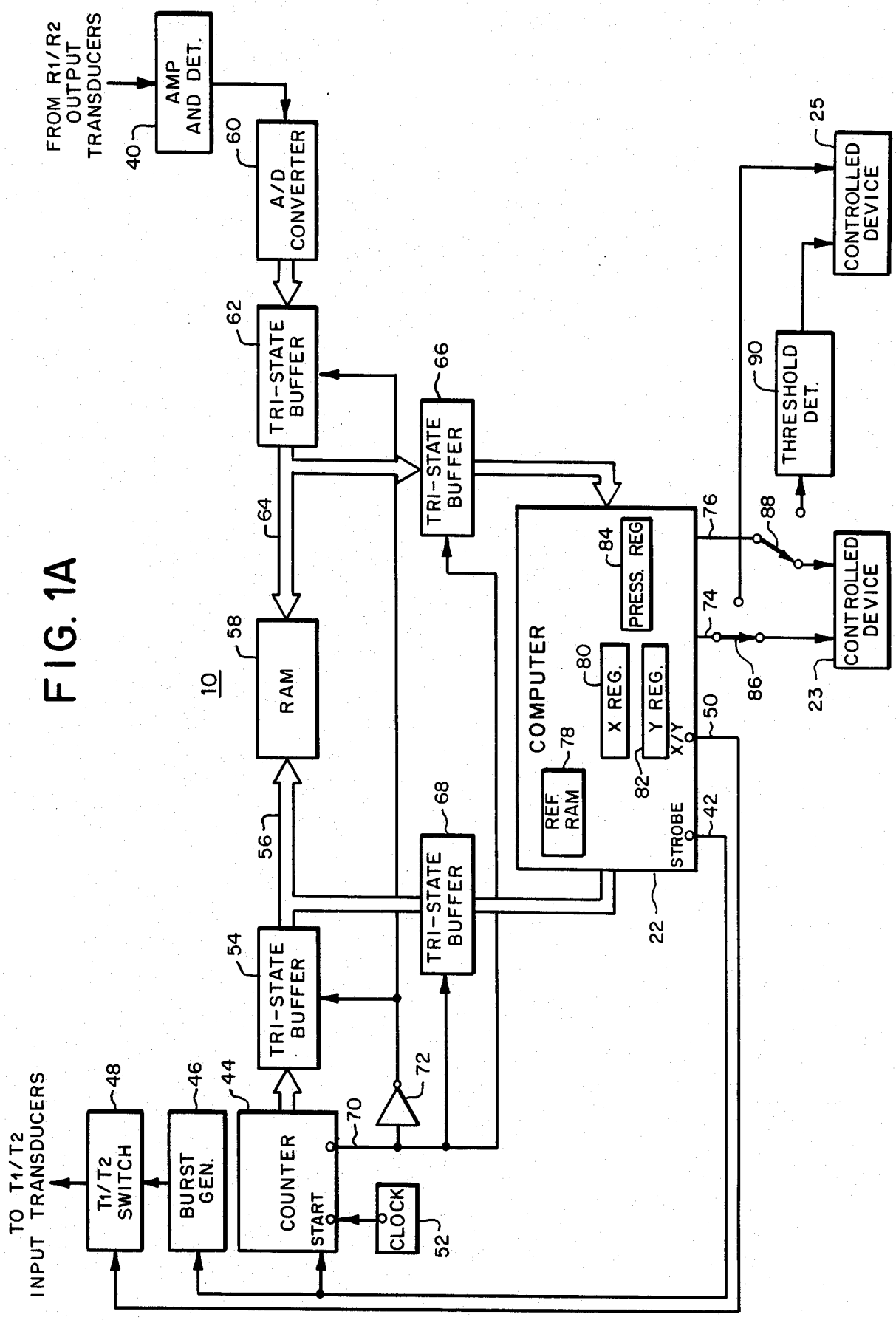
FIG. 1a is a block diagram of a touch panel control system for use with the display apparatus shown in FIG. 1.

With the foregoing as background, the manner in which the inventive touch panel control system 10 of FIG. 1a serves to generate and apply firing signals to substrate transducers T1 and T2 and, to analyze touch-perturbed surface wave components delivered by receiver transducers R1 and R2, will now be presented.

FIG. 1a comprises a block diagram of control system 10 which is connected between the input transducers T1, T2 and the output transducers R1 and R2. As will be explained in further detail hereinafter, control system 10 initiates the generation of properly timed surface acoustic waves across substrate surface 16 of the touch panel and processes the analog output signals S1, S2, produced in response thereto, graphically depicted in FIGS. 3 and 4, for deriving respective control signals containing information indicative of touch position and touch pressure.

More particularly, the control system 10 comprises a computer 22 having a strobe output terminal 42 connected to the start input of a counter 44 and to the input of a burst generator 46. In response to a strobe signal, which defines the beginning of a memory "write" cycle, burst generator 46 generates a high frequency burst (for example, 16 to 24 cycles at 4 MHz) which is coupled to a T1/T2 (X/Y) switch 48 for application to the T1 and T2 transducers. The state of switch 48 is controlled by a bit developed on an X/Y output 50 of computer 22 such that the burst is alternately coupled to the X and Y transducers (T1/T2) for producing surface acoustic waves across the touch panel in the X and Y (as they are conventionally designated) directions. The strobe signal also enables counter 44 which begins counting clock pulses generated by a clock 52. The output of counter 44 comprises a sequence of address signals which are coupled by an enabled tri-state buffer 54 to an address bus 56 for application to the address input of a RAM 58. The amplitude modulated signal 53 or 54 developed by either the R1 or R2 output transducers in response to the high frequency burst is coupled by an amplifier and detector 40 to the input of an A/D converter 60. A/D converter 60 converts the analog input signal to a digital format, for example-a six bit signal, the digital signal being coupled by a second enabled tri-state buffer 62 to a data bus 64 for application to the data input of RAM 58 as well as to the input of a third tri-state buffer 66 whose output is connected to the data input of computer 22. A fourth and final tri-state buffer 68 is coupled between an address output of computer 22 and data bus 56. During a memory "write" cycle initiated by a strobe pulse on output 42 of computer 22, buffers 66 and 68 are both disabled inhibiting the application of data to computer 22 via buffer 66 and the application of address signals from computer 22 to address bus 56 via buffer 68. Thus, during the memory "write" cycle a plurality of digital samples, e.g., 320, of the X or Y analog output signal are written into RAM 58 in response to the address signals from counter 44.

After counter 44 completes a full counting cycle, (i.e. 320 clock pulses) it is internally held in its final counting state and an output 70 thereof transitions from a logically low to a logically high state. This transition defines the end of a memory "write" cycle and the beginning of a memory "read" cycle. In particular, the logically high level on output 70 enables buffers 66 and 68 and is coupled through an inverter 72 for disabling previously enabled buffers 54 and 62. During the ensuing memory "read" cycle, address signals generated by computer 22 are therefore coupled through enabled buffer 68 to address bus 56 for reading the digital samples stored in RAM 58 onto data bus 64. The stored digital samples read onto data bus 64 are coupled through enabled buffer 66 to computer 22 which, as will be explained in further detail hereinafter, processes the data to develop two control signals on outputs 74 and 76 respectively representing the position and pressure of a touch on the touch panel substrate 16. After all of the samples stored in RAM 58 have been read into and processed by computer 22, another strobe pulse is developed on output 42 initiating a second memory "write" cycle, followed by another memory "read" cycle, and so on. It will be understood that the X/Y bit on output 50 toggles X/Y switch 48 during alternate memory "write" cycles so that surface waves are alternately generated in the X and Y directions.

In a preferred embodiment of the invention, the first two memory "write" cycles following power-up of computer 22 establish reference profiles of the analog output signal in both the X and Y directions against which subsequent outputs are compared to establish touch position and pressure. These reference profiles are stored in a reference RAM 78 of computer 22 during the memory "read" cycles following the first two memory "write" cycles.

During each subsequent memory "write" cycle, which is preferably accomplished at a relatively high speed (e.g., 4.0 Mega-writes/sec) 320 digital samples representing either the X or Y output signal are written into RAM 58. The samples are subsequently transferred to computer 22 at a much slower rate (e.g., 250 kiloreads/sec) for processing. Computer 22 is programmed for comparing each sample as it is received from RAM 58 with the corresponding reference sample stored in reference RAM 78. Any positive difference between a reference sample stored in RAM 78 and the value of the corresponding sample being read from RAM 58 exceeding a predetermined noise threshold represents a touch on the substrate surface 16.

The position or location of the touch on the panel 16 is established in relation to the memory locations in RAM 78 at which the differences in the X and Y directions were detected. The pressure of the touch is established in relation to the magnitude of the differences. In particular, it has been found useful to average the differences in the X and Y directions to represent the touch pressure. This average difference may conveniently be derived by dividing the sum of the X and Y differences by a factor of two. The derived touch location or position information is stored in an X-register 80 and a Y-register 82 and developed on output 74 while the derived touch pressure information is stored in a pressure-register 84 and developed on output 76.

For purposes of illustration, the touch position and pressure information provided on outputs 74 and 76 respectively of computer 22 are shown as being coupled through a pair of switches 86 and 88 to two controllable devices 23 and 25. With the switches in the positions shown in FIG. 1a, both the position and pressure representative signals are applied to device 23. The signal on output 74 will thus provide touch position information to device 23 while the signal on output 76 will provide touch pressure information to device 23. Since the touch pressure information has a high degree of resolution, preferably comprising, for example, a six bit signal, it may be considered to be indicative of plural discrete non-zero levels of touch pressure, or a continuum of levels of touch pressure and thus effectively represent a continuously variable signal of the type useful for representing analog functions such as volume control and the like.

When switches 86 and 88 are switched to their other positions, touch position information is directly provided to device 25 while touch pressure information is coupled to the device through a threshold detector 90. Threshold detector 90 may, for example, be designed to provide an output to device 25 only when the pressure information on output 76 exceeds a selected threshold value. In this manner, an on/off type function of device 25 can be conveniently controlled in response to touch pressure. By way of example, in an application or embodiment wherein the system is configured as it appears when switches 86 and 88 couple the outputs on 74 and 76 to device 25, the system could be designed such that touch pressure above a predetermined noise threshold activates a display or indicator signalling the user that a certain function has been selected. Pressing the panel harder causes a second threshold to be exceeded and the command to be "entered". As a second example, with the switches 86, 88 in the other position, an operative touch (above the noise threshold) might activate a display (a car radio, e.g.,)—pressing harder might then control the volume of the output from the radio.

Figure 5:
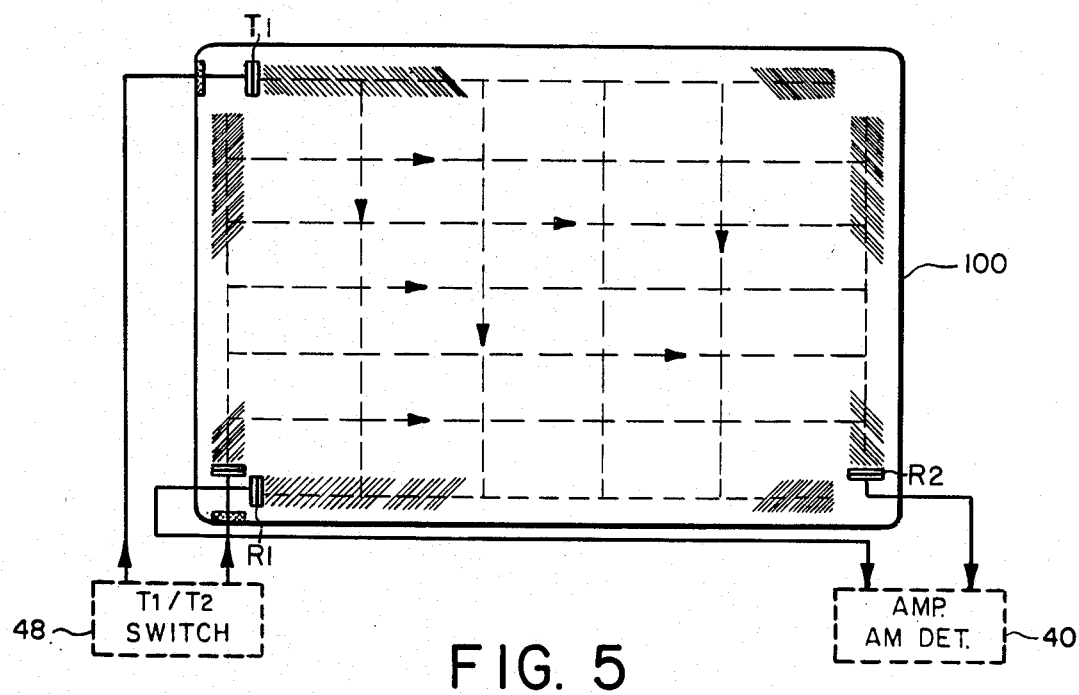
FIG. 5 is a representation of a touch control panel for controlling a cursor associated with a remote controllable apparatus.

FIG. 5 depicts an embodiment wherein the touch panel can comprise a form of a key pad substrate 100, that is, a control as the generation and distribution of acoustic surface waves across substrate 100 is concerned, such generation and detection of touch-perturbated surface waves is achieved in the same manner as that for the principal embodiment. As shown, by the phantom blocks associated with the transducers, the input and output signals are processed by the touch panel control system 10 already described. It is contemplated that such a key pad would be particularly attractive as a remote controller. Specifically the key pad could be hand held and actuated to trace a pattern or to locate a cursor upon a remote display panel. When a desired cursor location is reached, pressure is then applied to the key pad to produce a control effect. If the display panel is associated with a CRT, the control effect can be employed to change a menu, delete a word or block at the selected cursor location, or move a word or block, etc.

Figure 6:
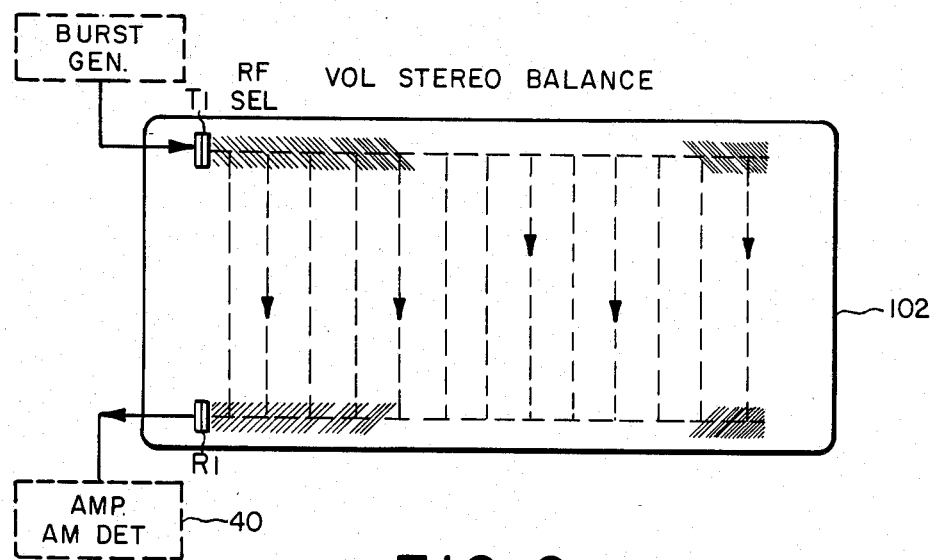
FIG. 6 is a representation of a single coordinate touch control panel.

Another area of application for such a key-pad is in the field of video games. The traced path of the finger could develop a first signal to effect tracking (location) of a target on a display device then the application of pressure could develop a second signal that effectively fires a missile at the target. In accordance with the invention, in each key-pad example discussed above, resort to the above-described touch panel control system serves to produce two control signals, one related to touch location and the second related to touch pressure.

FIG. 6 illustrates the application of the inventive touch control system to an embodiment characterized by a single coordinate touch panel 102. Again, surface wave generation and detection of touch-perturbated surface waves is accomplished in the manner above described. Specifically the control panel shown therein can comprise a console controller for a radio or a television receiver, a stereo player, etc. In a receiver application, the application of a touch near the left side of the panel could serve to develop a first control signal to activate an RF signal selector, then, applying pressure at that location will develop a second control signal that initiates a scanning across the RF spectrum with the magnitude of pressure being determinative of scanning speed.

In like fashion, moving the finger to the right will develop a control signal that gives the operator control of audio volume. Then, of course, the application of pressure provides the second control signal to adjust volume level. Control of other functions would entail developing, at other locations, the two control signals to (1) select a function and (2) exert a control effect thereto.

Beyond the field of consumer electronics, including, of course, word processors and other devices utilizing a display device, it is contemplated that the invention would be particularly attractive in commercial installations, e.g., a bank cash station where a rugged substrate surface, in conjunction with the inventive touch control system, could be employed to input control signals to the station to withdraw cash, interrogate an account, etc. In fact, the invention finds application in any field where a pair of control signals reflecting a touch location and accompanying touch pressure are utilizable to perform two related or even unrelated functions.

We claim:

1. A touch panel system, comprising:
   a substrate having an acoustic surface wave propagating touch surface;
   means for generating and receiving surface acoustic waves on said touch surface;
   means responsive to a surface wave absorbing touch on said touch surface for developing an output signal representative of the degree of absorption of said surface acoustic waves by said touch, said signal having a first characteristic indicative of the position of the touch on said touch surface and a second characteristic indicative of the touch pressure; and
   means for receiving said output signal and responsive to said first characteristic for identifying a predetermined controllable function and responsive to said second characteristic for controlling said controllable function.

2. A touch panel system, comprising:
   a substrate having an acoustic surface wave propagating touch surface;
   means for generating and receiving surface acoustic waves on said touch surface;
   means responsive to a surface wave absorbing touch on said touch surface for developing an output signal representative of the degree of absorption of said surface acoustic waves by said touch, said signal having a first characteristic indicative of the positon of the touch on said touch surface and a second characteristic indicative of the touch pressure; and
   means for receiving said output signal and responsive to said first characteristic for developing a first control signal reflecting said touch position and responsive to said second characteristic for developing a second control signal reflecting said touch pressure.

3. A touch panel system, comprising:
   a substrate having an acoustic surface wave propagating touch surface;
   means for generating and receiving surface acoustic waves on said touch surface;
   means responsive to a surface wave absorbing touch on said touch surface for developing an output signal representative of the degree of absorption of said surface acoustic waves by said touch, said signal having a first characteristic indicative of the position of the touch on said touch surface and a second characteristic indicative of plural discrete non-zero levels of touch pressure or a continuum of levels of touch pressure; and
   circuit means responsive to said first characteristic for developing a first signal containing information indicative of the position of the touch, and responsive to said second characteristic for developing a second signal containing information indicative of plural discrete non-zero levels of touch pressure or a continuum of levels of touch pressure.

4. A surface acoustic wave touch panel system, comprising:
   a substrate having a touch surface capable of propagating surface waves;
   means including surface wave transducer means for launching and receiving surface waves on said surface;
   means responsive to a surface wave absorbing touch on said surface for developing an output signal representative of the degree of absorption of said surface acoustic waves by said touch, said signal having a first wave-timing-related characteristic and a second characteristic indicative of plural discrete non-zero levels of damping or a continuum of levels of damping of said surface acoustic waves propagating on said surface through the region of the touch; and
   means receiving said output signal and responsive to said first characteristic for identifying a controllable function and responsive to said second characteristic for controlling said controllable function.

5. A surface acoustic wave touch panel system, comprising:
   a substrate having a touch surface capable of propagating surface waves;
   means including surface wave transducer means for launching and receiving surface waves on said surface;
   means responsive to a surface wave absorbing touch on said surface for developing an output signal representative of the degree of absorption of said surface acoustic waves by said touch, said signal having a first wave-timing-related characteristic and a second characteristic indicative of plural discrete non-zero levels of damping or a continuum of levels of damping of said surface acoustic waves propagating on said surface through the region of the touch; and circuit means responsive to said first characteristic for developing a first signal containing information indicative of the position of the touch, and responsive to said second characteristic for developing a second signal containing information indicative of plural discrete non-zero levels of touch pressure or a continuum of levels of touch pressure.

6. A touch panel system for recognizing touch positions along a predetermined coordinate axis on a touch surface and for responding to touch pressure, comprising:
a substrate having a touch surface capable of propagating surface acoustic waves and being so characterized that a touch on said surface damps the amplitude of a surface wave propagating through the region of the touch;
input surface wave transducer means coupled to said substrate surface for launching a burst of surface waves on said surface;
output surface wave transducer means coupled to said substrate;
surface wave redirecting means for redirecting surface wave burst components derived from said surface wave burst across said surface and to said output transducer means along a plurality of paths of different lengths which are respectively associated with different positions along said coordinate axis on said touch surface; and
circuit means coupled to said input and output transducer means for initiating surface wave bursts on said surface and for detecting touch-induced amplitude damping of received wave burst components, said circuit means developing an output signal having a first wave-timing-related characteristic indicative of which of said plurality of paths was traversed by the touch-damped wave burst component and thus the location of the touch along said coordinate axis of said surface, said output signal having a second characteristic indicative of the touch-pressure-induced damping of said wave burst component propagating on said surface through the region of the touch; and
recognition circuit means receiving said output signal and responsive to said first characteristic for developing a first signal containing information indicative of the position of the touch, and responsive to said second characteristic for developing a second signal containing information indicative of plural discrete non-zero levels of touch pressure or a continuum of levels of touch pressure.

7. A touch panel system for recognizing touch positions along a predetermined coordinate axis on a touch surface and for responding to touch pressure, comprising:
a substrate having a touch surface capable of propagating surface acoustic waves and being so characterized that a touch on said surface damps the amplitude of a surface wave propagating through the region of the touch;
input surface wave transducer means coupled to said substrate surface for launching a burst of surface waves on said surface;
output surface wave transducer means coupled to said substrate;
surface wave redirecting means for redirecting surface wave burst components derived from said surface wave burst across said substrate and to said output transducer means along a plurality of paths of different lengths which are respectively associated with different positions along said coordinate axis on said touch surface; and
circuit means coupled to said input and output transducer means for initiating surface wave bursts on said surface and for detecting touch-induced amplitude damping of received wave burst components, said circuit means developing an output signal having a signal-level-versus-time characteristic with a dip whose location on the time axis is indicative of the transit time of the detected damped wave burst component, and whose depth is indicative of the degree of damping of the detected damped wave burst component,
said circuit means being responsive to the timing of said dip in the signal-level-versus-time characteristic of said output signal for developing a first signal containing information indicative of the location of the touch along said coordinate axis of said surface, said circuit means also being responsive to the depth of said dip for developing a second signal containing information indicative of the level of damping of said surface acoustic waves propagating on said surface through said region of the touch.

8. For use with touch-controllable apparatus, a system for recognizing and utilizing touch actuations of different pressures along a predetermined coordinate axis on a surface associated with said apparatus, comprising:
a substrate having a surface capable of propagating surface acoustic waves and being so characterized that a touch on said surface causes a perturbation of a surface wave propagating through the region of the touch, the magnitude of said perturbation being related to touch pressure;
surface acoustic wave scanning means including input surface wave transducer means coupled to said substrate surface for effecting scanning of said surface with a timed succession of surface acoustic wave bursts directed in a plurality of substantially parallel overlapping paths across said surface transversely to said coordinate axis, each of said plurality of paths being respectively associated with a different position along said coordinate axis on said substrate surface;
output surface wave transducer means coupled to said substrate surface for receiving said bursts of surface waves; and
circuit means coupled to said input and output transducer means for initiating said timed succession of surface wave bursts on said substrate surface and for detecting touch-induced perturbations of received wave bursts, said circuit means including means coupled to said output transducer means for developing an output signal having a first characteristic representative of the timing of a touch perturbed received burst and thus determinative of which of said plurality of paths was traversed by said touch-perturbed wave burst and thereby the location of the touch along said coordinate axis of said substrate surface, said output signal having a second characteristic representative of the magnitude of the perturbation occasioned by the touch pressure-induced perturbation of the waves passing the region of the touch; and
recognition circuit means receiving said output signal and responsive to said first characteristic for developing a first signal containing information indicative of the position of the touch, and responsive to said second characteristic for developing a second signal containing information indicative of plural discrete non-zero levels of touch pressure or a continuum of levels of touch pressure.

9. For use with controllable apparatus, a system for recognizing and locating an intentional perturbation of a surface acoustic wave propagating along one of a multiplicity of paths disposed transverse to a predetermined coordinate axis of a surface associated with said apparatus and for utilizing the magnitude of the perturbation to produce a control effect, said arrangement comprising:

a substrate having a surface capable of propagating surface acoustic waves and being so characterized that a touch on said surface causes a perturbation of a surface wave propagating through the region of the touch, the magnitude of said perturbation being related to touch pressure;

an input transducer coupled to said substrate surface and responsive to an input signal for launching acoustic surface waves along a first path on said surface;

a first reflective grating comprising an array of reflective elements disposed along said first path, with said elements effectively arranged at like angles of incidence to the longitudinal axis of said first path, for extracting from said surface wave a multiplicity of wave components and for directing said wave components across said substrate surface along a like multiplicity of paths each disposed at an angle to said axis of said first path;

an output transducer coupled to said substrate surface at the terminus of a second path on said surface for developing an output signal upon receipt of surface acoustic wave energy;

a second reflective grating comprising an array of reflective elements disposed along said second path and effectively arranged at like angles of incidence to the longitudinal axis of said second path for intercepting said wave components and for redirecting said intercepted wave components along said second path toward said output transducer;

circuit means coupled to said output transducer and responsive to said output signal for identifying a coordinate of the location of said touch induced perturbation; and detector means also coupled to said output transducer and responsive to a change in a characteristic of said output signal, attributable to said perturbation, for exerting a control effect determined by the magnitude of said perturbation.

10. The apparatus defined by claim 2, 3, 5 or 8 wherein said means for developing said first and second control signals includes means for:

(a) sampling the amplitude of the rectified output from said output transducer means at a plurality of time spaced points, (b) storing the amplitude samples for future reference, (c) during a touch of the apparatus, again sampling the amplitude of the said output transducer output and comparing the developed touch-related amplitude samples with the stored reference samples, and (d) developing said first control signal representing the timing-related point of greatest difference between the amplitudes of said reference samples and said touch-related samples and thus the timing of said touch-perturbed wave burst, and developing said second control signal representing the magnitude of the said greatest difference.

* * * * *